March 29, 1932.  G. A. MITCHELL  1,851,400

FILM MOVEMENT

Original Filed April 25, 1930   2 Sheets-Sheet 1

Inventor
George A. Mitchell

Attorney.

March 29, 1932.   G. A. MITCHELL   1,851,400
FILM MOVEMENT
Original Filed April 25, 1930   2 Sheets-Sheet 2

Inventor
*George A. Mitchell.*

Attorney.

Patented Mar. 29, 1932

1,851,400

UNITED STATES PATENT OFFICE

GEORGE A. MITCHELL, OF LOS ANGELES, CALIFORNIA, ASSIGNOR TO MITCHELL CAMERA CORPORATION, OF WEST HOLLYWOOD, CALIFORNIA, A CORPORATION OF DELAWARE

FILM MOVEMENT

Application filed April 25, 1930, Serial No. 447,295. Renewed January 11, 1932.

This invention relates generally to intermittent movement mechanisms, and more particularly to intermittent film movements for motion picture cameras and the like.

The general type of movement with which the present invention is concerned embodies an oscillative claw arm operable intermittently to engage and pull down the film, and film holding mechanism operable on the film alternately with the claw arm to hold the film in proper register with the exposure aperture while not being moved by the claw arm.

It is a general object of the present invention to provide a film movement of the type referred to that is simple in construction, dependable, as well as exceptionally quiet in operation, and that at the same time has a fast "pull-down" and long period of "dwell", as well as other desired motion characteristics relating to the engagement and disengagement of the claw pins with the film and to the shape of the pull-down path.

The film moving parts of the present mechanism, which are of the general type disclosed and broadly claimed in my co-pending application filed on even date herewith, and entitled "Film movement" Serial Number 447,294, include, more or less specifically stated, an oscillative claw arm, a crank pin carried by a rotating shaft and operating in a longitudinal guide slot intermediate the ends of the claw arm to impart transverse components of motion to the arm, and an eccentric on the rotating shaft and connected to the rear end of the claw arm to impart longitudinal components of motion thereto. This arrangement results in an extremely quiet high-speed movement of fast pull-down and other desirable and important characteristics as will become more apparent hereinafter.

It is a further object of the present invention to provide such a film movement as is referred to above with simple and dependable film engaging means for holding the film stationary alternately with the operation of the claw arm, and for this purpose to provide a simple operative interconnection between the claw arm and the film engaging member.

It is a shortcoming of prior film engaging devices that such devices invariably have some movement relative to the film during the period in which the claw arm is withdrawn from the film, which of course causes the pilot pins to saw on the edges of the film perforations during that time, as well as unsteadiness of the film.

It is therefore another object of the invention to provide such an operative interconnection between the film engaging member as will cause the film engaging member to remain in stationary engagement with the film during the time the claw arm is withdrawn from the film and is moving through its return path.

With this preliminary discussion in mind, the invention itself will be most readily understood from the following detailed description of a present preferred embodiment thereof, reference for this purpose being had to the accompanying drawings, in which:

The mechanism of the invention is adapted to be arranged in a case of any suitable design and construction and may be arranged to co-operate with suitable shutter mechanism and with a suitable arrangement of lenses, etc. For the purpose of simplicity, however, the invention is herein set forth independent of any particular casing, shutter mechanism, arrangement of lenses, etc., it being apparent how the mechanism can be incorporated in a suitable design with such units.

Before proceeding to a description of a preferred specific embodiment of the invention, it is to be noted that the invention is not to be limited, in certain of its aspects, to the details of the driving elements for the film moving claw arm, as these features of the invention are broadly applicable to any film moving claw arm having or approximating certain of the characteristic movements to be described.

Referring now to the drawings, the numeral 10 designates a vertical aperture plate having an exposure aperture 11, and the numeral 12 designates a vertical wall arranged at right angles to and extending rearwardly from an edge of plate 10. Spaced rearward from aperture plate 10 and extending at right angles from a plate 12a fastened face to face against wall 12 is a guide plate 13, between which and the aperture plate is provided the guide way for the film F. The film is moved intermittently in the guide way by the film moving mechanism, later to be described, while during the periods of "dwell", or alternately with the periods of movement or "pull-down" the film is engaged by film holding mechanism, which registers successive film frames $f$ with the exposure aperture 11. The film guide way is vertically disposed except at the lower portion thereof where it is curved rearwardly to conform to the curvature of motion of the film moving means, now to be described.

The film is advanced by means of film moving pins 15 that extend through vertical slots 16 in plate 13 from the ends of a cross arm 17 arranged at the forward end of a swinging claw arm 18, which is operated to cause its film moving pins to intermittently engage the film perforations $p$ and draw the film downwardly (or upwardly) through successive frame lengths. The film moving pins are of proper size and are so shaped as to fit nicely in the film perforations.

Pilot pins 20, which are also of proper size and shape to fit nicely in the film perforations, are intermittently operated to engage the film alternately with the film moving pins, in such a manner that the pilot pins engage the film perforations $p$ just before the film moving pins are withdrawn therefrom, and are withdrawn from the film just after the film moving pins again engage the film perforations, so that the film is always engaged by one or the other of the pairs of pins.

The drive shaft for the movement is indicated at 24 (see Fig. 5), journalled in a bearing 25 carried in the walls 12 and 12a of the movement. Just forwardly of bearing 25 shaft 24 has an eccentric 26, and around this eccentric fits the strap of a rearwardly extending connecting arm 28, the rear end of which is in the form of a slide rod 29 that is taken by a pivoted slide-bearing block 30, bearing block 30 being carried on the end of a stud 31 rotatably supported in a stationary bearing 32. It will be seen that rotation of eccentric 26 will cause the rear end portion 29 of connecting arm 28 to slide in bearing 30 and pivot on the axis of stud 31. An eccentric is here shown rather than a cam because it gives the circular arc motion later to be described.

Figure 1:
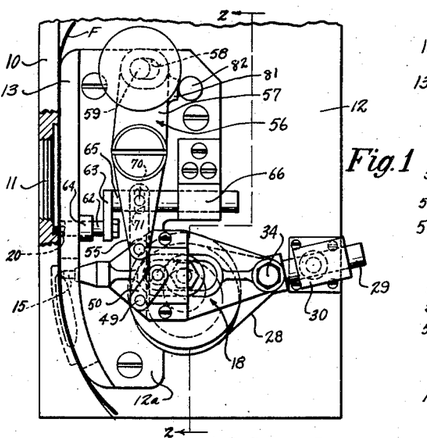
Fig. 1 is a side elevation of the movement in an operative position, the claw arm being shown just before entering the film.
Figure 5:
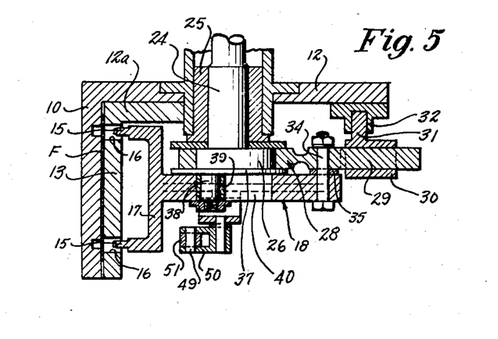
Fig. 5 is a section taken on line 5—5 of Fig. 4.

Pivoted to the rear end of the arm 28 just forwardly of the pivoted slide bearing 30 by means of a pivot pin 34, is the rear end of the claw arm 18, hereinbefore referred to, a flat washer 35 serving to space the arms at this point, as clearly shown in Fig. 5. It will be understood how the motion of arm 28 imparts horizontal or longitudinal motion to the claw arm 18, while means now to be described are provided for simultaneously moving the claw arm in a transverse direction, in such a manner that the arm will pivot at pin 34 and describe a path to intermittently engage and pull down the film. Integral with drive shaft 24 and formed at the outer end of eccentric 26 is a spacing flange or disk 37, and carried by this disk is a crank pin 38. This crank pin carries a slider block 39 that works in a guide groove 40 provided in the intermediate portion of the claw arm and operates to impart vertical or transverse components of motion to the claw arm. The crank pin 38 and the direction of eccentricity of the eccentric 26 are 180 degrees apart with respect to the axis of the drive shaft 24, and the direction of rotation of these parts is right handed as viewed in the aspect of Fig. 1.

Figure 3:
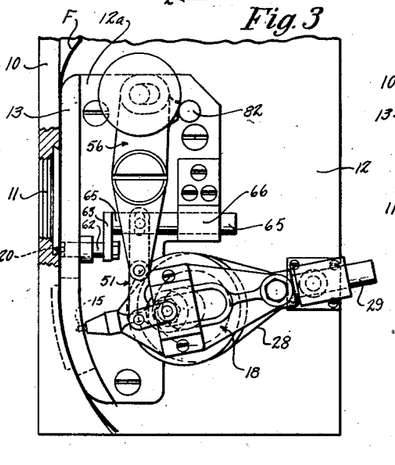
Fig. 3 is an elevation of the movement showing another operative position thereof, the claw arm being in this case out of engagement with the film and at the midpoint on its return path.
Figure 6:
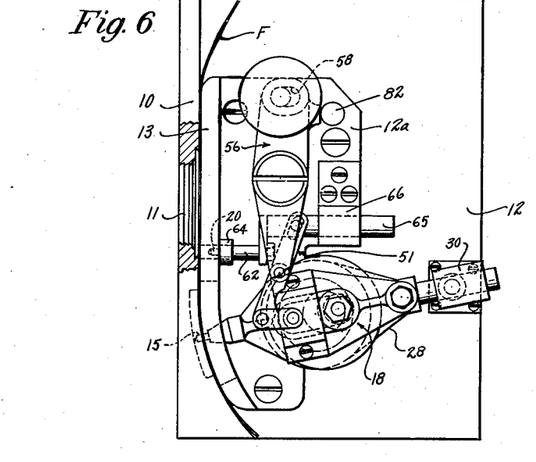
Fig. 6 is an elevation of the movement showing another operative position thereof, the claw arm in this case being in engagement with the film and at a midpoint in the pull down stroke.

It will be noted that in the position of Figs. 3 and 5 the eccentric arm is in its extreme rearward position so that the claw arm is withdrawn from the film, and that the crank pin is moving upwardly to carry the claw arm through its return path; and that in Fig. 6 the eccentric arm is substantially in its extreme forward position so that the pins of the claw arm are in engagement with the film while the crank pin is moving downwardly to carry the claw arm through its pull down stroke.

The description will be facilitated by now referring to Fig. 7, which is a diagram showing the generation of the path of points on the claw arm 18 and on the film holding mechanism, later to be detailed. The circle $c$ is the path of the crank pin and the circle is a circle of eccentricity of the eccentric 26 or in other words the path of the equivalent crank. Starting with the position in which the claw arm is disengaged from the film and is at the mid-point of its return path, successive positions are taken at 30 degree in tervals of the crank and eccentric circles c and e. The arms 28 and 18 are shown in the diagram only for the 60 degree position, in which the claw arm is moving upwardly through its return path, although the positions assumed by the forward end of the claw arm and by the pivotal connection of the claw arm with the eccentric arm are marked for each 30 degree interval. The fixed pivot point on which the eccentric arm slides and pivots is indicated at P.

Figure 7:
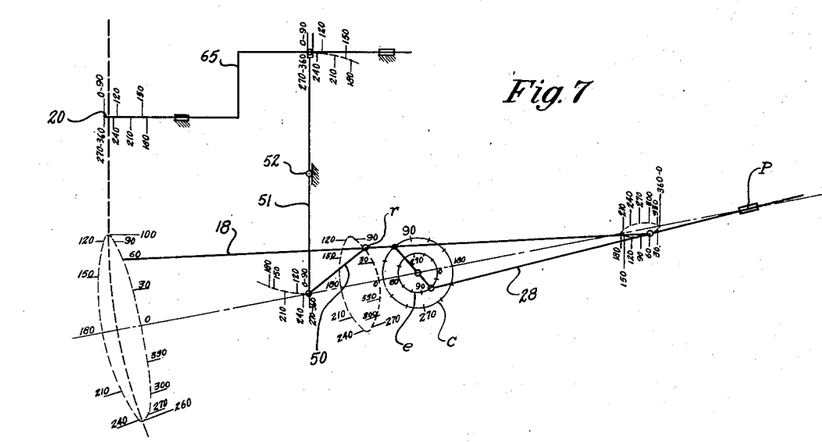
Fig. 7 is a diagrammatic illustration of the movement.

It will be noted in Fig. 7 that the path of the forward end of the claw arm is convex on the back stroke. Now the convexity of the path of any point on the claw arm as the claw arm pivots and advances during the back stroke, bears a direct relation to the distance of that point from the rearward or pivoted end of the claw arm, and a point on arm 18 to the right of the forward end thereof accordingly has a path more convex than does the forward end of the arm. And it is possible to find on arm 18, to the right of its forward end, a point $r$ which has a nearly perfect circular arc path during the upward or return stroke of the claw arm. (It may now be noted that eccentrics or cranks are here shown for the operation of the claw arm because of the circular arc path obtainable with their use.)

Therefore, in accordance with the present invention, a link 50 equal in length to the radius of the circular arc path of point $r$ is pivotally connected at one end to the claw arm at the location of the point $r$, the other end of link 50 being pivotally connected, at the location of the center of the circular arc path of point $r$, to the lower end of a lever 51, lever 51 being pivotally supported intermediate its ends at 52 and being connected at its upper end to a bar 65 on which the pilot pins are carried, all as diagrammatically indicated in Fig. 7.

Accordingly, during the upward or return stroke of the claw arm the pivotal connection point $r$ of arm 18 with link 50 travels through the arc of a circle, the center of which coincides with the other end of link 50, which is pivoted to the lower end of lever 51. Therefore, during this phase of movement link 50 simply pivots about its connection with lever 51 as a center and no motion is imparted to lever 51 and to the pilot pins, which are during that time in stationary engagement with the film. As the claw arm 18 finally reaches the upper limit of its return stroke and moves into engagement with the film in preparation for the pull-down stroke, however, the pivotal connection point $r$ of arm 18 with link 50 departs from its circular arc path of the back stroke and moves relatively inward toward the film, and as the claw arm then travels downwardly the pivot point $r$ follows the curved pull-down path indicated from approximately 100 to 250 degrees in the diagram, this causing the lower end of lever 51 to swing forwardly in an arc about its pivotal mounting 52 as a center. The corresponding rearward travel of the upper end of the lever accordingly causes bar 65 to withdraw the pilot pins from the film. The pivoted ends of link 50 and lever 51 then follow the loci indicated for the duration of the pull-down, maintaining the pilot pins out of engagement with the film until the claw arm reaches the lower limit of its stroke. At that time the pivotal connection $r$ of arm 18 with link 50 has again reached its circular arc return-stroke path and the pivotal connection of the other end of link 50 with lever 51 is again at its locus at the center of that circular arc path. The pilot pins are then again in engagement with the film and will remain stationary therein during the return stroke of the claw arm, as will now be fully understood.

The preferred physical embodiment of this pilot pin arrangement is shown in Figs. 1 to 4. The pilot pins extend forwardly from studs 62 carried at the opposite ends of a cross-arm 63, studs 62 having sliding bearing within bushings 64 extending through guide plates 13. Cross arm 63 is carried on the forward end of a slide rod 65, the rear end of which is taken in a slide bearing 66.

The operative connection between the claw arm 18 and the slide rod 65 as then embodied is as follows: Attached to the outer face of claw arm 18 and passing over the described point on the claw arm that has the described circular arc motion during the upward or back stroke thereof is a saddle 47, and the link 50, previously referred to in connection with the diagram of Fig. 7, is pivotally connected thereto by means of a pin 48 at a point over the path of circular arc motion. Link 50 is then pivotally connected at its other end through a pivot pin 49 to the end of the lower arm 50a of lever 51, the length of link 50 between the centers of its pivot pins being, of course, made equal to the radius of the circular arc through which its outer end moves with arm 18, while the lever 51 is so arranged that its pivotal connection with link 50 is at the center of that circular arc path during the movement of the claw arm through its upward or return stroke.

Figure 2:
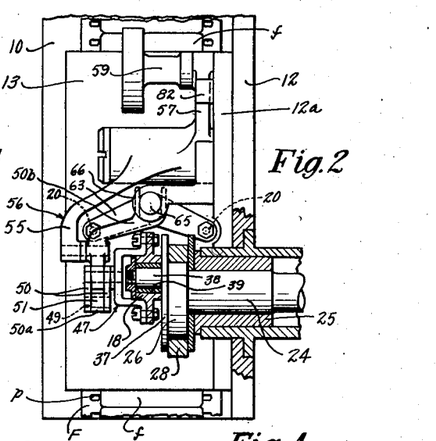
Fig. 2 is a broken transverse vertical section taken on the broken line 2—2.

Lever 51 is pivotally mounted upon the lower end of the depending arm 55 of a lever 56, lever 56 being in turn pivotally mounted upon the stationary frame plate 12a. The upper arm 57 of lever 56 faces against plate 12a and has an arcuate slot 58 through which passes a clamping screw 59 which screw threads into the plate 12a to hold the lever rigidly in operative position. The lower arm 55 of lever 56, which lever is normally fixed in the position of Figs. 1, 3 and 6, overhangs the movement and pivotally supports the lever 51 as clearly shown in Fig. 2. The upper arm 50b of lever 51 is curved inwardly, as shown in Fig. 2, and is bifurcated at its upper end to take the slide rod 65, with which it is pivotally connected by means of a pin 70 carried by rod 65 and taken within a longitudinal slot 71 provided through its bifurcations.

It will now be understood, from what has previously been said in connection with the diagram of Fig. 7, how the pilot pins will be operated through this linkage to engage the film just before the claw pins are withdrawn therefrom, how the lever arm 51 remains substantially stationary while the claw arm moves upwardly through its return stroke, and how at the end of the return stroke the pilot pins are withdrawn from the film when the claw pins again engage the film.

Figure 4:
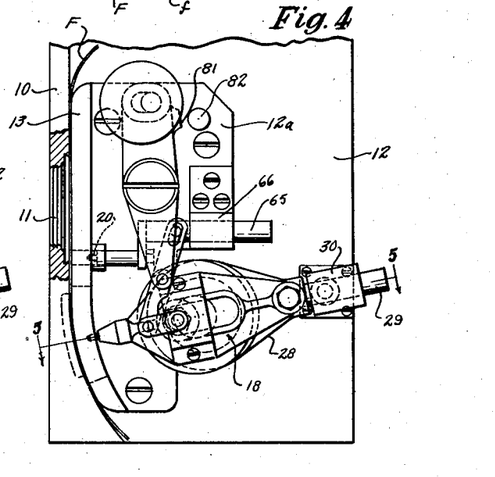
Fig. 4 is an elevation of the movement showing both the film moving and pilot pins withdrawn from the film path for the purpose of threading the film through the movement.

The film is always normally engaged by either the film moving or film holding pins, and therefore, when it is desired to thread the film through the movement, the movement is brought to a position with the claw arm removed from the film path (Fig. 3), when the clamping screw 59 is loosened and the lever 56 rotated to the position of Fig. 4. This operation moves the pivotal mounting 52 of lever 51 rearwardly, which swings the lever 51 rearwardly about its connection with link 50 as a pivot and thereby acts to withdraw the slide rod 65 and accordingly remove the pilot pins from the film. Lever 56 is returned to the exact operating position by bringing it back until its boss 81 comes into engagement with a stop pin 82, when the clamping screw is set up tightly. This general provision for threading the film is disclosed in my copending application entitled "Kinetograph movement", Ser. No. 384,013, filed August 7, 1929.

Broadly considered, it will be obvious that the pilot pin connection is not limited to the details of how the claw arm is driven, it being only required that there be a point on the claw arm which has or approximates substantially circular motion during the return stroke, when the present described pilot pin connection is applicable. It will also be obvious that various changes in design, structure and arrangement may be made in the movement without departing from the spirit and scope of the claims appended hereto. And in this connection it may here be mentioned, that in the claims the expression eccentric is used in a generic sense to include within its purview all such fundamentally similar elements as eccentrics, cranks or rotational cams, any one of which might be used in a specific design for the operation of the claw arm.

I claim:

1. In a film movement, the combination of a frame providing a film guideway, a film moving claw arm, means for imparting to said claw arm intermittent film engaging and moving motion such that a point on said arm moves substantially in a circular arc during the motion of the arm while out of film engagement, a film engaging member operable on the film alternately with the claw arm and adapted to hold the film stationary, and interconnecting means between said film engaging member and the claw arm, said means including a member pivotally connected to the claw arm at said point of circular motion and having another pivotal connection lying substantially at the center of said circular arc.

2. In a film movement, the combination of a frame providing a film guideway, a film moving claw arm, means for pivotally and slidably supporting the claw arm, eccentric means operating on the claw arm to give said arm intermittent film engaging and moving motion such that a point on said arm moves substantially in a circular arc during the motion of the arm while out of film engagement, a film engaging member operable on the film alternately with the claw and adapted to hold the film stationary, and interconnecting means between said film engaging member and the claw arm, said means including a member pivotally connected to the claw arm at said point of circular motion and having another pivotal connection lying substantially at the center of said circular arc.

3. In a film movement, the combination of a frame providing a film guideway, a film moving claw arm, means for operating said arm to intermittently engage and move a film in the guideway, said means including a rotatable drive shaft, an eccentric on said shaft, a connection between said eccentric and said claw arm whereby longitudinal components of motion are given to the claw arm, another eccentric on the drive shaft, a longitudinally slidable connection between the last mentioned eccentric and the claw arm whereby transverse components of motion are given to the claw arm, all in such a manner that a point on the claw arm moves substantially in a circular arc during the motion of the arm while out of film engagement, a film engaging member operable on the film alternately with the claw arm and adapted to hold the film stationary, and interconnecting means between said film engaging member and the claw arm, said means including a member pivotally connected to the claw arm at said point of circular motion and having another pivotal connection lying substantially at the center of said circular arc.

4. In a film movement, the combination of a frame providing a film guideway, a film moving claw arm, means for operating said claw arms to intermittently engage and move a film in the guideway, said means including a rotatable drive shaft, an eccentric on said shaft, a connection between said eccentric and the rearward end of said claw arm whereby longitudinal components of motion are given to said claw arm, another eccentric on said drive shaft, a longitudinally slidable connection between the last mentioned eccentric and an intermediate portion of the claw arm whereby transverse components of motion are given to the claw arm, all in such a manner that a point on the claw arm moves substantially in a circular arc during the motion of the arm while out of film engagement, a film engaging member operable on the film alternately with the claw arm and adapted to hold the film stationary, and interconnecting means between said film engaging member and the claw arm, said means including a member pivotally connected to the claw arm at said point of circular motion and having another pivotal connection lying substantially at the center of said circular arc.

5. In a film movement, the combination of a frame providing a film guideway, a film moving claw arm, means for operating said claw arm to intermittently engage and move a film in the guideway, said means including a rotatable drive shaft disposed transversely to and intermediate the ends of said claw arm, an eccentric on said drive shaft, a connecting arm from said eccentric pivoted to the rearward portion of the claw arm, a slide bearing for a rearward portion of one of said arms, another eccentric on the drive shaft, a longitudinally slidable connection between the last mentioned eccentric and an intermediate section of the claw arm, all in such a manner that a point on the claw arm moves substantially in a circular arc during the motion of the arm while out of film engagement, a film engaging member operable on the film alternately with the claw arm and adapted to hold the film stationary, and interconnecting means between said film engaging member and the claw arm, said means including a member pivotally connected to the claw arm at said point of circular motion and having another pivotal connection lying substantially at the center of said circular arc.

6. In a film movement, the combination of a frame providing a film guideway, a film moving claw arm, means for operating said claw arm to intermittently engage and move a film in the guideway, said means including a rotatable drive shaft disposed transversely to and intermediate the ends of said claw arm, an eccentric on said drive shaft, a connecting arm from said eccentric pivoted to the rearward portion of the claw arm, a slide bearing for a rearward portion of one of said arms, a crank pin on said drive shaft operating in a longitudinal guide slot in an intermediate section of said claw arm, all in such a manner that a point on the claw arm moves substantially in a circular arc during the motion of the arm while out of film engagement, a film engaging member operable on the film alternately with the claw arm and adapted to hold the film stationary, and interconnecting means between said film engaging member and the claw arm, said means including a member pivotally connected to the claw arm at said point of circular motion and having another pivotal connection lying substantially at the center of said circular arc.

7. In a film movement, the combination of a frame providing a film guideway, a film moving claw arm, means for imparting to said claw arm intermittent film engaging and moving motion such that a point on said arm moves substantially in a circular arc during the motion of the arm while out of film engagement, a film engaging member operable on the film alternately with the claw arm adapted to hold the film stationary, and interconnecting means between said film engaging member and the claw arm, said means including a movable motion transmitting element having a connection pivot whose loci include a locus substantially at the center of said circular arc, and a connecting member pivotally connected to the claw arm at said point of circular arc motion and, at a distance equal to the radius of said circular arc, connected with the connection pivot of said motion transmitting element.

8. In a film movement, the combination of a frame providing a film guideway, a film moving claw arm, means for pivotally and slidably supporting the claw arm, eccentric means operating on the claw arm to give said arm intermittent film engaging and moving motion such that a point on said arm moves substantially in a circular arc during the motion of the arm while out of film engagement, a film engaging member operable on the film alternately with the claw and adapted to hold the film stationary, and interconnecting means between said film engaging member and the claw arm, said means including a movable motion transmitting element having a connection pivot whose loci include a locus substantially at the center of said circular arc, and a connecting member pivotally connected to the claw arm at said point of circular arc motion and, at a distance equal to the radius of said circular arc, connected with the connecting pivot of said motion transmitting element.

9. In a film movement, the combination of a frame providing a film guideway, a film moving claw arm, means for operating said arm to intermittently engage and move a film in the guideway, said means including a rotatable drive shaft, an eccentric on said shaft, a connection between said eccentric and said claw arm whereby longitudinal components of motion are given to the claw arm, another eccentric on the drive shaft, a longitudinally slidable connection between the last mentioned eccentric and the claw arm whereby transverse components of motion are given to the claw arm, all in such a manner that a point on the claw arm moves substantially in a circular arc during the motion of the arm while out of film engagement, a film engaging member operable on the film alternately with the claw arm and adapted to hold the film stationary, and interconnecting means between said film engaging member and the claw arm, said means including a movable motion transmitting element having a connection pivot whose loci include a locus substantially at the center of said circular arc, and a connecting member pivotally connected to the claw arm at said point of circular arc motion and, at a distance equal to the radius of said circular arc, connected with the connection pivot of said motion transmitting element.

10. In a film movement, the combination of a frame providing a film guideway, a film moving claw arm, means for operating said claw arms to intermittently engage and move a film in the guideway, said means including a rotatable drive shaft, an eccentric on said shaft, a connection between said eccentric and the rearward end of said claw arm whereby longitudinal components of motion are given to said claw arm, another eccentric on said drive shaft, a longitudinally slidable connection between the last mentioned eccentric and an intermediate portion of the claw arm whereby transverse components of motion are given to the claw arm, all in such a manner that a point on the claw arm moves substantially in a circular arc during the motion of the arm while out of film engagement, a film engaging member operable on the film alternately with the claw arm and adapted to hold the film stationary, and interconnecting means between said film engaging member and the claw arm, said means including a movable motion transmitting element having a connection pivot whose loci include a locus substantially connected to the claw arm at said point of circular arc motion and, at a distance equal to the radius of said circular arc, connected with the connection pivot of said motion transmitting element.

11. In a film movement, the combination of a frame providing a film guideway, a film moving claw arm, means for operating said claw arm to intermittently engage and move a film into the guideway, said means including a rotatable drive shaft disposed transversely to and intermediate the ends of said claw arm, an eccentric on said drive shaft, a connecting arm from said eccentric pivoted to the rearward portion of the claw arm, a slide bearing for a rearward portion of one of said arms, another eccentric on the drive shaft, a longitudinally slidable connection between the last mentioned eccentric and an intermediate section of the claw arm, all in such a manner that a point on the claw arm moves substantially in a circular arc during the motion of the arm while out of film engagement, a film engaging member operable on the film alternately with the claw arm and adapted to hold the film stationary and interconnecting means between said film engaging member and the claw arm, said means including a movable motion transmitting element having a connection pivot whose loci include a locus substantially at center of said circular arc, and a connecting member pivotally connected to the claw arm at said point of circular arc motion and, at a distance equal to the radius of said circular arc, connected with the connection pivot of said motion transmitting element.

12. In a film movement, the combination of a frame providing a film guideway, a film moving claw arm, means for operating said claw arm to intermittently engage and move a film in the guideway, said means including a rotatable drive shaft disposed transversely to and intermediate the ends of said claw arm, an eccentric on said drive shaft, a connecting arm from said eccentric pivoted to the rearward portion of the claw arm, a slide bearing for a rearward portion of one of said arms, a crank pin on said drive shaft operating in a longitudinal guide slot in an intermediate section of said claw arm, all in such a manner that a point on the claw arm moves substantially in a circular arc during the motion of the arm while out of film engagement, a film engaging member operable on the film alternately with the claw arm and adapted to hold the film stationary, and interconnecting means between said film engaging member and the claw arm, said means including a movable motion transmitting element having a connection pivot whose loci include a locus substantially at the center of said circular arc, and a connecting member pivotally connected to the claw arm at said point of circular arc motion and, at a distance equal to the radius of said circular arc, connected with the connection pivot of said motion transmitting element.

13. In a film movement, the combination of a frame providing a film guideway, a film moving claw arm, means for imparting to said claw arm intermittent film engaging and moving motion such that a point on said arm moves substantially in a circular arc during the motion of the arm while out of film engagement and such as to give said point a movement out of said circular arc during the motion of the claw arm in engagement with the film, a film engaging member operable on the film with the claw arm and adapted to hold the film stationary, and interconnecting means between said film engaging member and the claw arm, said means including a member pivotally connected to the claw arm at said point of circular motion and having another pivotal connection lying substantially at the center of said circular arc.

14. In a film movement, the combination of a frame providing a film guideway, a film moving claw arm, means for pivotally and slidably supporting the claw arm, eccentric means operating on the claw arm to give said arm intermittent film engaging and moving motion such that a point on said arm moves substantially in a circular arc during the motion of the arm while out of film engagement and such as to give said point a movement out of said circular arc during the motion of the claw arm in engagement with the film, a film engaging member operable on the film alternately with the claw and adapted to hold the film stationary, and interconnecting means between said film engaging member and the claw arm, said means including a member pivotally connected to the claw arm at said point of circular motion and having another pivotal connection lying substantially at the center of said circular arc.

15. In a film movement, the combination of a frame providing a film guideway, a film moving claw arm, means for operating said arm to intermittently engage and move a film in the guideway, said means including a rotatable drive shaft, an eccentric on said shaft, a connection between said eccentric and said claw arm whereby longitudinal components of motion are given to the claw arm, another eccentric on the drive shaft, a longitudinally slidable connection between the last mentioned eccentric and the claw arm whereby transverse components of motion are given to the claw arm, all in such a manner that a point on the claw arm moves substantially in a circular arc during the motion of the arm while out of film engagement, and such as to give said point a movement out of said circular arc during the motion of the claw in engagement with the film, a film engaging member operable on the film alternately with the claw arm and adapted to hold the film stationary, and interconnecting means between said film engaging member and the claw arm, said means including a member pivotally connected to the claw arm at said point of circular motion and having another pivotal connection lying substantially at the center of said circular arc.

16. In a film movement, the combination of a frame providing a film guideway, a film moving claw arm, means for operating said claw arm to intermittently engage and move a film in the guideway, said means including a rotatable drive shaft, an eccentric on said shaft, a connection between said eccentric and the rearward end of said claw arm whereby longitudinal components of motion are given to said claw arm, another eccentric on said drive shaft, a longitudinally slidable connection between the last mentioned eccentric and an intermediate portion of the claw arm whereby transverse components of motion are given to the claw arm, all in such a manner that a point on the claw arm moves substantially in a circular arc during the motion of the arm while out of film engagement and such as to give said point a movement out of said circular arc during the motion of the claw arm in engagement with the film, a film engaging member operable on the film alternately with the claw arm and adapted to hold the film stationary, and interconnecting means between said film engaging member and the claw arm, said means including a member pivotally connected to the claw arm at said point of circular motion and having another pivotal connection lying substantially at the center of said circular arc.

17. In a film movement, the combination of a frame providing a film guideway, a film moving claw arm, means for operating said claw arm to intermittently engage and move a film into the guideway, said means including a rotatable drive shaft disposed transversely to and intermediate the ends of said claw arm, an eccentric on said drive shaft, a connecting arm from said eccentric pivoted to the rearward portion of the claw arm, a slide bearing for a rearward portion of one of said arms, another eccentric on the drive shaft, a longitudinally slidable connection between the last mentioned eccentric and an intermediate section of the claw arm, all in such a manner that a point on the claw arm moves substantially in a circular arc during the motion of the arm while out of film engagement, and such as to give said point a movement out of said circular arc during the motion of the claw arm in engagement with the film, a film engaging member operable on the film alternately with the claw arm and adapted to hold the film stationary, and interconnecting means between said film engaging member and the claw arm, said means including a member pivotally connected to the claw arm at said point of circular motion and having another pivotal connection lying substantially at the center of said circular arc.

18. In a film movement, the combination of a frame providing a film guideway, a film moving claw arm, means for operating said claw arm to intermittently engage and move a film in the guideway, said means including a rotatable drive shaft disposed transversely to and intermediate the ends of said claw arm, an eccentric on said drive shaft, a connecting arm from said eccentric pivoted to the rearward portion of the claw arm, a slide bearing for the rearward portion of one of said arms, a crank pin on said drive shaft operating in a longitudinal guide slot in an intermediate section of said claw arm, all in such a manner that a point on the claw arm moves substantially in a circular arc during the motion of the arm while out of film engagement, and such as to give said point a movement out of said circular arc during the motion of the claw arm in engagement with the film, a film engaging member operable on the film alternately with the claw arm and adapted to hold the film stationary, and interconnecting means between said film engaging member and the claw arm, said means including a member pivotally connected to the claw arm at said point of circular motion and having another pivotal connection lying substantially at the center of said circular arc.

19. In a film movement, the combination of a frame providing a film guideway, a film moving claw arm, means for imparting to said claw arm intermittent film engaging and moving motion such that a point on said arm moves substantially in a circular arc during the motion of the arm while out of film engagement, and such as to give said point a movement out of said circular arc during the motion of the claw arm in engagement with the film, a film engaging member operable on the film alternately with the claw arm and adapted to hold the film stationary, and interconnecting means between said film engaging member and the claw arm, said means including a movable motion transmitting element having a connection pivot whose loci include a locus substantially at the center of said circular arc, and a connecting member pivotally connected to the claw arm at said point of circular arc motion and, at a distance equal to the radius of said circular arc, connected with the connection pivot of said motion transmitting element.

20. In a film movement, the combination of a frame providing a film guideway, a film moving claw arm, means for pivotally and slidably supporting the claw arm eccentric means operating on the claw arm to give said arm intermittent film engaging and moving motion such that a point on said arm moves substantially in a circular arc during the motion of the arm while out of film engagement and such as to give said point a movement out of said circular arc during the motion of the claw arm in engagement with the film, a film engaging member operable on the film alternately with the claw and adapted to hold the film stationary, and interconnecting means between said film engaging member and the claw arm, said means including a movable motion transmitting element having a connection pivot whose loci include a locus substantially at the center of said circular arc, and a connecting member pivotally connected to the claw arm at said point of circular arc motion and, at a distance equal to the radius of said circular arc, connected with the connecting pivot of said motion transmitting element.

21. In a film movement, the combination of a frame providing a film guideway, a film moving claw arm, means for operating said arm to intermittently engage and move a film in the guideway, said means including a rotatable drive shaft, an eccentric on said shaft, a connection between said eccentric and said claw arm whereby longitudinal components of motion are given to the claw arm, another eccentric on the drive shaft, a longitudinally slidable connection between the last mentioned eccentric and the claw arm whereby transverse components of motion are given to the claw arm, all in such a manner that a point on the claw arm moves substantially in a circular arc during the motion of the arm while out of film engagement, and such as to give said point a movement out of said circular arc during the motion of the claw in engagement with the film, a film engaging member operable on the film alternately with the claw arm and adapted to hold the film stationary, and interconnecting means between said film engaging member and the claw arm, said means including a movable motion transmitting element having a connection pivot whose loci include a locus substantially at the center of said circular arc, and a connecting member pivotally connected to the claw arm at said point of circular arc motion and, at a distance equal to the radius of said circular arc, connected with the connecting pivot of said motion transmitting element.

22. In a film movement, the combination of a frame providing a film guideway, a film moving claw arm, means for operating said claw arm to intermittently engage and move a film in the guideway, said means including a rotatable drive shaft, an eccentric on said shaft, a connection between said eccentric and the rearward end of said claw arm whereby longitudinal components of motion are given to said claw arm, another eccentric on said drive shaft, a longitudinally slidable connection between the last mentioned eccentric and an intermediate portion of the claw arm whereby transverse components of motion are given to the claw arm, all in such a manner that a point on the claw arm moves substantially in a circular arc during the motion of the arm while out of film engagement and such as to give said point a movement out of said circular arc during the motion of the claw arm in engagement with the film, a film engaging member operable on the film alternately with the claw arm and adapted to hold the film stationary, and interconnecting means between said film engaging member and the claw arm, said means including a movable motion transmitting element having a connection pivot whose loci include a locus substantially at the center of said circular arc, and a connecting member pivotally connected to the claw arm at said point of circular arc motion and, at a distance equal to the radius of said circular arc, connected with the connection pivot of said motion transmitting element.

23. In a film movement, the combination of a frame providing a film guideway, a film moving claw arm, means for operating said claw arm to intermittently engage and move a film into the guideway, said means including a rotatable drive shaft disposed transversely to and intermediate the ends of said claw arm, an eccentric on said drive shaft, a connecting arm from said eccentric pivoted to the rearward portion of the claw arm, a slide bearing for a rearward portion of one of said arms, another eccentric on the drive shaft, a longitudinally slidable connection between the last mentioned eccentric and an intermediate section of the claw arm, all in such a manner that a point on the claw arm moves substantially in the circular arc during the motion of the arm while out of film engagement, and such as to give said point a movement out of said circular arc during the motion of the claw arm in engagement with the film, a film engaging member operable on the film alternately with the claw arm and adapted to hold the film stationary, and interconnecting means between said film engaging member and the claw arm, said means including a movable motion transmitting element having a connection pivot whose loci include a locus substantially at center of said circular arc, and a connecting member pivotally connected to the claw arm at said point of circular arc motion and, at a distance equal to the radius of said circular arc, connected with the connection pivot of said motion transmitting element.

24. In a film movement, the combination of a frame providing a film guideway, a film moving claw arm, means for operating said claw arm to intermittently engage and move a film in the guideway, said means including a rotatable drive shaft disposed transversely to and intermediate the ends of said claw arm, an eccentric on said drive shaft, a connecting arm from said eccentric pivoted to the rearward portion of the claw arm, a slide bearing for a rearward portion of one of said arms, a crank pin on said drive shaft operating in a longitudinal guide slot in an intermediate section of said claw arm, all in such a manner that a point on the claw arm moves substantially in a circular arc during the motion of the arm while out of film engagement, and such as to give said point a movement out of said circular arc during the motion of the claw arm in engagement with the film, a film engaging member operable on the film alternately with the claw arm and adapted to hold the film stationary, and interconnecting means between said film engaging member and the claw arm, said means including a movable motion transmitting element having a connection pivot whose loci include a locus substantially at the center of said circular arc, and a connecting member pivotally connected to the claw arm at said point of circular arc motion and, at a distance equal to the radius of said circular arc, connected with the connection pivot of said motion transmitting element.

25. In a film movement, the combination of a film moving claw mechanism for intermittently engaging and advancing a film, said mechanism including an oscillating member having a point that moves substantially in a circular arc during the motion of the mechanism while out of film engagement, a film holding means engaging the film alternately with the claw mechanism, and interconnecting means between said film holding means and said claw mechanism, said interconnecting means including a member pivotally connected to said oscillating member at said point of circular arc motion and having another pivotal connection with the film holding means lying substantially at the center of said circular arc.

26. In a film movement, the combination of a film moving claw mechanism for intermittently engaging and advancing a film, said mechanism including an oscillating member having a point that moves substantially in a circular arc during the motion of the mechanism while out of film engagement, a film holding means engaging the film alternately with the claw mechanism, and interconnecting means between said film holding means and said claw mechanism, said interconnecting means including a movable motion transmitting element having a connection pivot whose loci include a locus substantially at the center of said circular arc, and a connecting member pivotally connected to said oscillating member at said point of circular arc motion and, at a distance equal to the radius of said circular arc, connected with the connection pivot of said motion transmitting element.

27. In a film movement, the combination of a film moving claw mechanism for intermittently engaging and advancing a film, said mechanism including an oscillating member having a point that moves substantially in a circular arc during the motion of the mechanism while out of film engagement and that moves out of said circular arc during the motion of the mechanism while engaging the film, a film holding means engaging the film alternately with the claw mechanism, and interconnecting means between said film holding means and said claw mechanism, said interconnecting means including a member pivotally connected to said oscillating member at said point of circular arc motion and having another pivotal connection lying substantially at the center of said circular arc.

28. In a film movement, the combination of a film moving claw mechanism for intermittently engaging and advancing a film, said mechanism including an oscillating member having a point that moves substantially in a circular arc during the motion of the mechanism while out of film engagement and that moves out of said circular arc during the motion of the mechanism while engaging the film, a film holding means engaging the film alternately with the claw mechanism, and interconnecting means between said film holding means and said claw mechanism, said interconnecting means including a movable motion transmitting element having a connection pivot whose loci include a locus substantially at the center of said circular arc, and a connecting member pivotally connected to said oscillating member at said point of circular arc motion and, at a distance equal to the radius of said circular arc, connected with the connection pivot of said motion transmitting element.

In witness that I claim the foregoing I have hereunto subscribed my name this 19th day of March, 1930.

GEORGE A. MITCHELL.